US012647306B2

(12) United States Patent　　　(10) Patent No.:　US 12,647,306 B2
Bucci　　　　　　　　　　　　　　 (45) Date of Patent:　　　Jun. 2, 2026

(54) DEMODULATOR CIRCUIT

(71) Applicant: Infineon Technologies AG, Neubiberg (DE)

(72) Inventor: Marco Bucci, Graz (AT)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 18/886,262

(22) Filed: Sep. 16, 2024

(65) Prior Publication Data

US 2026/0081813 A1　　Mar. 19, 2026

(51) Int. Cl.
　　*H04L 27/06*　　　(2006.01)
　　*H04B 1/40*　　　 (2015.01)
　　*H04L 27/148*　　 (2006.01)

(52) U.S. Cl.
　　CPC .............. *H04L 27/06* (2013.01); *H04B 1/40* (2013.01); *H04L 27/148* (2013.01)

(58) Field of Classification Search
　　CPC .......... H04L 27/06; H04L 27/148; H04B 1/40
　　See application file for complete search history.

(56) References Cited

U.S. PATENT DOCUMENTS

| 8,125,258 | B2 * | 2/2012 | Ishizaki | ................ | H04L 27/227 |
| | | | | | 329/307 |
| 2003/0094976 | A1 * | 5/2003 | Miyashita | .............. | H03D 7/145 |
| | | | | | 327/40 |
| 2008/0116883 | A1 * | 5/2008 | Ruehl | ................. | G01D 5/2093 |
| | | | | | 324/207.17 |
| 2014/0169038 | A1 * | 6/2014 | Kamath | ................... | H03D 3/00 |
| | | | | | 363/16 |
| 2017/0149512 | A1 * | 5/2017 | Einzinger | ............. | H04W 52/08 |

OTHER PUBLICATIONS

Machine translation of WO-2013183770-A1 (Year: 2013).*

* cited by examiner

*Primary Examiner* — Jean B Corrielus
(74) *Attorney, Agent, or Firm* — Mueting Raasch Group

(57)　　　　　　　ABSTRACT

A demodulator includes a sampling stage, a hold stage, and an output stage. The sampling stage includes at least one mixer configured to be controlled by complementary clock signals synchronous with a carrier frequency of an input signal to demodulate the input signal and generate a sampled signal. The hold stage includes at least a first capacitor circuit configured to output the sampled signal after delaying the sampled signal as a first hold signal and a second capacitor circuit configured to output the sampled signal after delaying the sampled signal as a second hold signal. The output stage is configured to alternately couple the first hold signal and the second hold signal as a demodulated output signal.

20 Claims, 9 Drawing Sheets

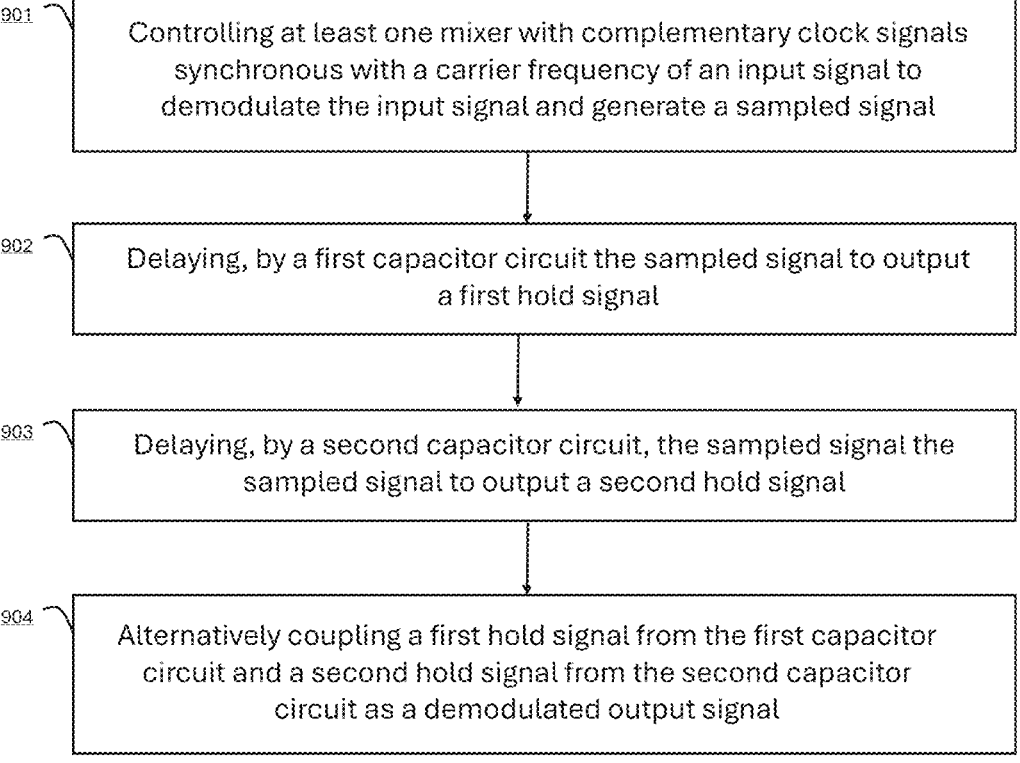

901 — Controlling at least one mixer with complementary clock signals synchronous with a carrier frequency of an input signal to demodulate the input signal and generate a sampled signal 902 — Delaying, by a first capacitor circuit the sampled signal to output a first hold signal 903 — Delaying, by a second capacitor circuit, the sampled signal the sampled signal to output a second hold signal 904 — Alternatively coupling a first hold signal from the first capacitor circuit and a second hold signal from the second capacitor circuit as a demodulated output signal

FIG. 9

DEMODULATOR CIRCUIT

TECHNICAL FIELD OF THE INVENTION

This invention relates generally to communications circuitry, more specifically demodulator circuits for communications circuitry.

BACKGROUND

In some applications, a traditional demodulator may demodulate a carrier signal with a relatively large amplitude to extract a subcarrier with comparatively a much lower amplitude (e.g., up to or greater than around −60 dB as one example). In some examples, a limited dynamic (i.e., range of an input signal that can be effectively demodulated) limits the amplitude of the input and consequently the amplitude of a demodulated output.

In some examples, a large carrier ripple on an output of a traditional demodulator may cause a residual carrier ripple of the demodulated output to be much larger than the demodulated signal. In some examples, these a large carrier ripple may cause issues for further stages. In some examples, complex filtering may be employed to remove the carrier ripple.

SUMMARY

In some aspects, to a demodulator is described. The demodulator includes a sampling stage including at least one mixer configured to be controlled by complementary clock signals synchronous with a carrier frequency of an input signal to demodulate the input signal and generate a sampled signal. The demodulator also includes a hold stage including at least a first capacitor circuit configured to output the sampled signal after delaying the sampled signal as a first hold signal and a second capacitor circuit configured to output the sampled signal after delaying the sampled signal as a second hold signal. The demodulator also includes an output stage configured to alternately couple the first hold signal and the second hold signal as a demodulated output signal.

In some aspects, a method is described that includes controlling at least one mixer with complementary clock signals synchronous with a carrier frequency of an input signal to demodulate the input signal and generate a sampled signal. The method further includes delaying, by a first capacitor circuit, the sampled signal to output a first hold signal. The method further includes delaying, by a second capacitor circuit, the sampled signal to output a second hold signal. The method further includes and alternately coupling the first hold signal and the second hold signal as a demodulated output signal.

In some aspects, a near field communication (NFC) receiver is described. The NFC receiver includes a demodulator that includes at least one mixer configured to controlled by complementary clock signals synchronous with a carrier frequency of an input signal to demodulate the input signal and generate a sampled signal. The demodulator further includes at least a first capacitor circuit configured to output the sampled signal after delaying the sampled signal as a first hold signal and a second capacitor circuit configured to output the sampled signal after delaying the sampled signal as a second hold signal. The demodulator further includes at least one switch configured to alternately couple the first hold signal and a second hold signal as a demodulated output signal.

BRIEF DESCRIPTION OF THE DRAWINGS

FIG. 9 is a flow diagram depicting one example of a method of operating a demodulator according to some embodiments.

DETAILED DESCRIPTION

Figure 1:
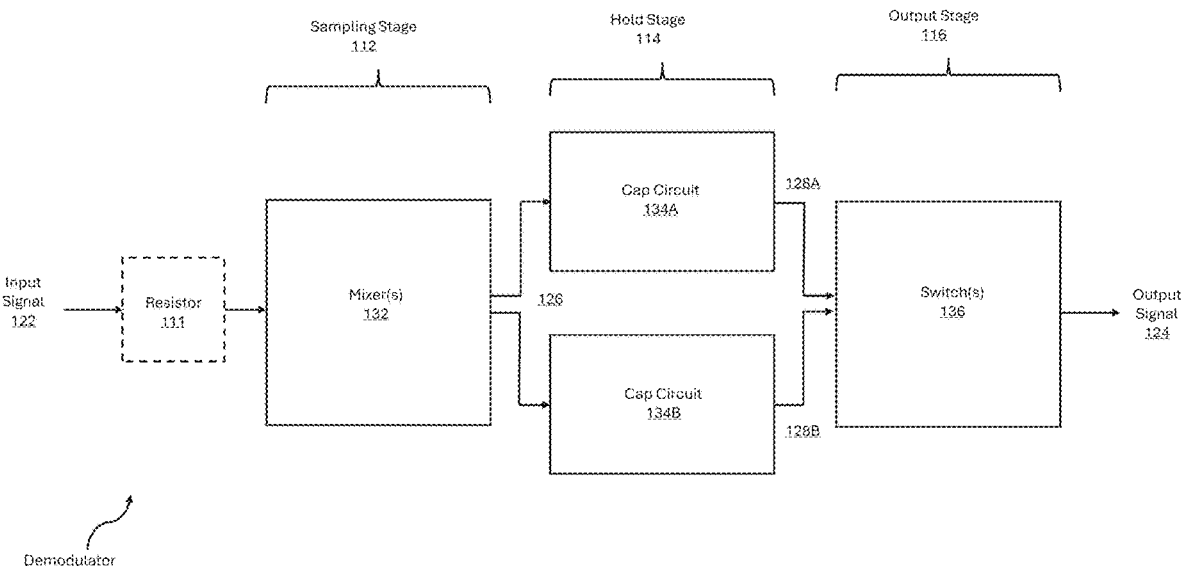
FIG. 1 is a block diagram that shows one example of a demodulator according to some embodiments.

FIG. 1 is a block diagram that shows one example of a demodulator 101 according to some embodiments. In some examples, the demodulator 101 is used in a wireless communications receiver devices to demodulate an input signal 122. As one non-limiting example, the demodulator 101 may used in a near field communications (NFC) receiver device, or another wired or wireless communications device. The demodulator 101 may be an Amplitude Modulation (AM) demodulator circuit, an IQ (in-phase and quadrature) demodulator circuit, or another type of demodulator circuit. In some examples, a demodulated output signal 124 of the demodulator 101 may be provided to one or more downstream circuits (not shown) for further processing, such as analog to digital conversion (ADC) circuitry or other circuitry used to process the demodulated output signal 124.

A traditional demodulator circuit includes a mixer circuit with two pairs of pass transistors driven by two complementary clock signals clk_p and clk_n, which are synchronous with a carrier of an input signal to be demodulated. In practice, the mixer operates by reversing or not reversing the output from the input depending on a phase of the complementary clock signals clk_p and clk_n. According to a traditional demodulator circuit, low pass filters comprising a resistor and a capacitor are coupled between an output of the mixer and an output of the traditional demodulator to reduce a carrier ripple on the traditional demodulator output.

According to a traditional demodulator circuit, the mixer is directly connected to the demodulator input, which is limited to the dynamics (available range) of the mixer. In addition, the low pass filter at the demodulator output may not provide sufficient attenuation of the carrier ripple to remove and/or sufficiently reduce its impact. In some examples, the carrier ripple on the traditional demodulator output may be more than one order of magnitude larger than the subcarrier component to be extracted, for example, due to a relatively low ratio between carrier and subcarrier frequencies, and a very high ratio between the carrier and subcarrier amplitudes.

The demodulator 101 depicted in the block diagram of FIG. 1 is particularly suited to demodulate input signals with a relatively large carrier signal amplitude in comparison with an amplitude of a subcarrier to be extracted from the carrier signal. As shown in the FIG. 1 examples, the demodulator 101 includes a sampling stage 112 to sample the input signal 122, a hold stage 114 that that stores and delays the sampled signal, and an output stage 116 that generates a demodulated output signal 124 of the demodulator 101.

As shown in FIG. 1, the sampling stage 112 includes one or more mixer(s) 132 configured to sample the input signal 122. For example, the mixer(s) 132 may include two pairs of matched pass transistors (not shown) driven by a complementary clock signals that are synchronous with a carrier of the input signal 122. As shown in FIG. 1, the mixer(s) 132 output a sampled signal 126 to the hold stage 114. The hold stage 114 includes a pair of capacitor circuits including a first capacitor circuit 134A and a second capacitor circuit 134B that are alternately operated to hold the sampled signal 126 for a delay time before outputting the sampled signal to the output stage 116. To generate the output signal 124, one or more switch(es) 136 of the output stage 116 alternately couple a delayed signal 128A from the first capacitor circuit 134A and a delayed signal 128B from the second capacitor circuit 134B as the output signal 124 of the demodulator 101.

In some examples, demodulator 101 is configured to synchronously sample the input signal 122. Accordingly, each sample is sampled with the same phase. If an amplitude of the input signal 122 remains substantially constant over a time period, the samples remain identical to one another. The capacitor circuits 134A, 134B each hold a previous period sample, meaning it is constant until a next sample. As such, if an intensity of the carrier remains substantially constant, the sequence of hold signals remains substantially constant as well. In some examples, demodulator 101 may be configured to completely remove a ripple from the input signal 122.

In some examples, as shown in FIG. 1, the demodulator 101 further includes one or more resistor(s) 111 coupled to an input of the sampling stage 112 (i.e., an input of the mixer(s) 132), that receives the input signal 122. In some examples, the resistor(s) 111 operate in conjunction with the first capacitor circuit 134A and the second capacitor circuit 134B as a low pass filter to filter the input signal 122. In some examples, arranging resistor (111) at an input of demodulator 101 exposes an input of the mixer stage 112 to a fraction of the full amplitude of the input signal 122, which may increase a dynamic range of the demodulator 101.

The demodulator 101 depicted in FIG. 1 may offer significant advantages in comparison to traditional demodulator circuits. For example, the demodulator 101 may be particularly suited to demodulate input signals that have a carrier signal with a large amplitude in comparison to subcarrier to be extracted from the carrier signal. More specifically, the demodulator 101 depicted in FIG. 1 may minimize an impact limited dynamic range and/or an impact that carrier ripple may have on downstream circuits that receive and further process the demodulated output signal 124 of the demodulator 101 in comparison to traditional demodulator circuits.

Figure 2:
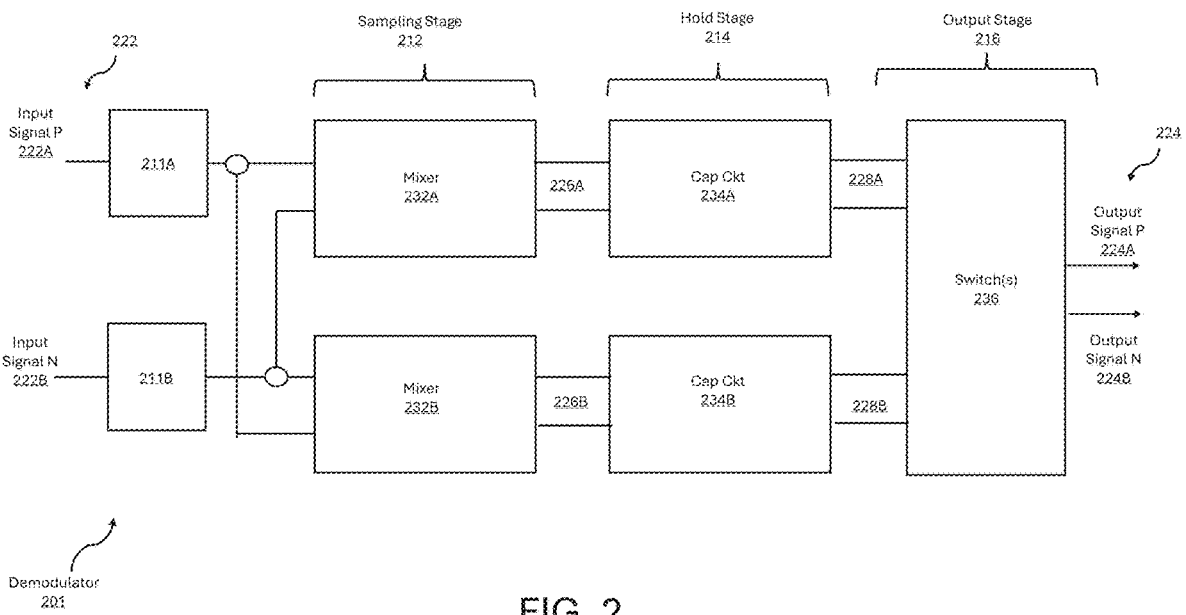
FIG. 2 is a block diagram of a demodulator with a sampling stage that includes a pair of mixers according to some embodiments.

FIG. 2 is a block diagram of a demodulator 201 with a sampling stage 212 that includes a pair of mixers 232A, 232B according to some embodiments. The demodulator 201 includes the sampling stage 212, a hold stage 214, and an output stage 216. In the example of FIG. 2, the pair of mixers 232A, 232B are coupled to receive a differential input signal 222 including a first input signal 222A and a second, complementary input signal 222B (i.e., with the same amplitude but opposite sign as the first input signal 222A). As shown in the FIG. 2 example, the mixers 232A, 232B each include two pair of matched pass transistors that alternately sample the differential input signal 222. In some examples, the mixers 232A, 232B are alternately operated in an active state to sample the input signal, and a deactivated sampling stage 212 (e.g., with high impedance). As shown in FIG. 2, the mixers 232A, 232B alternately output a sampled signal 226A, 226B to the hold stage 114.

As shown in FIG. 2, the hold stage 114 includes a first capacitor circuit 234A that receives the first sampled signal 226A, and a second capacitor circuit 234B that receives the second sampled signal 226B from the respective mixers 232A, 232B. Each of the capacitor circuits 234A, 234B includes a pair of capacitors coupled between the respective positive and negative signals of the differential sampled signal(s) 226A, 226B and a ground reference. The capacitor circuits 234A, 234B are each configured to hold the sampled signal sampled 226A, 226B from the respective mixer 232A, 232B, and generate a hold signal 228A, 228B after delaying the sampled signal 226A, 226B. As shown in FIG. 2, the output stage 216 includes a plurality of switches 236 that alternate between coupling a hold signal 228A from the first capacitor circuit 234A, and a hold signal 228B from the second capacitor circuit 234B as demodulated differential output signal 224 of the demodulator 201, including a positive output signal 224A and a negative output signal 224B.

In some examples, as shown in FIG. 2, the demodulator 201 further includes a pair of resistors 211A, 211B with first ends coupled to the respective positive and negative input signals 222A, 222B of the demodulator 201 and second ends coupled to the sampling stage 112 (i.e., an input of the mixers 232A, 232B), that receives the input signal 222. In some examples, the resistors 211A, 211B operate in conjunction with the first capacitor circuit 234A and the second capacitor circuit 234B as a low pass filter to filter the input signal 222. In some examples, arranging resistors 211A, 211B at an input of demodulator 201 exposes an input of the mixer stage 212 to a fraction of the full amplitude of the input signal 222A, 222B, which may increase a dynamic range of the demodulator 201 in comparison to traditional demodulator circuits.

Figure 3:
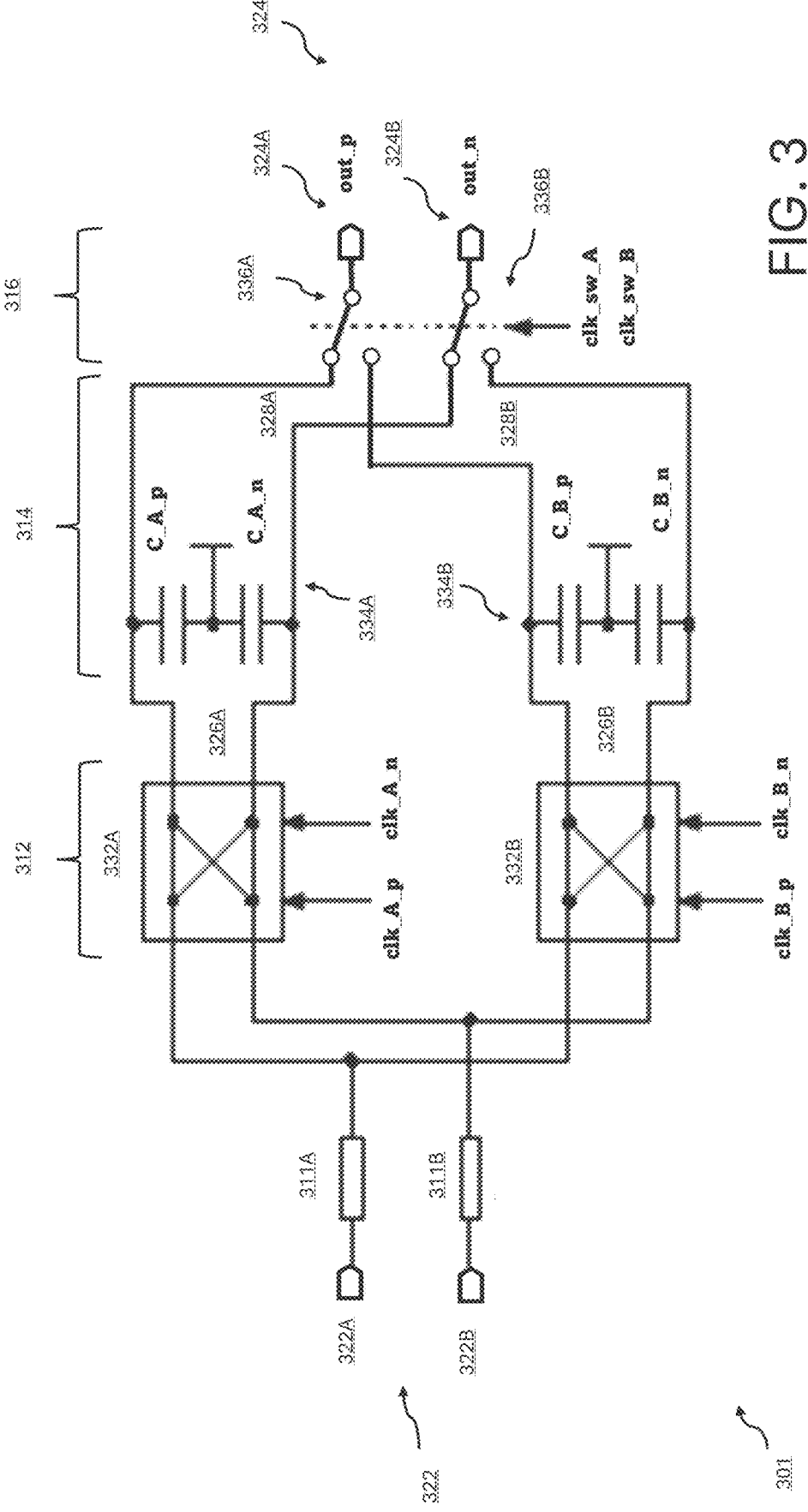
FIG. 3 is a circuit diagram that depicts a demodulator circuit with a sampling stage that includes a pair of mixers according to some embodiments.

FIG. 3 is a circuit diagram that depicts a demodulator circuit 301 with a sampling stage 312 that includes a pair of mixer circuits 332A, 332B according to some embodiments. As shown in FIG. 3, the demodulator circuit 301 includes the sampling stage 312, a hold stage 314, and a switching stage 316. Like the block diagram of FIG. 2, the sampling stage 312 includes a pair of mixer circuits 332A, 332B coupled to the input signal 322, which is a differential input signal including a first signal 322A and a complementary second signal 322B. As shown in FIG. 3, the pair of mixer circuits 332A, 332B include a two pair of matched transistors configured to be operated according to complementary clock signals clk_A_p/clk_A_n and clk_B_p/clk_B_n, respectively to sample the input signal 322 to generate sampled signals 326A and 326B. In some examples, the pair of mixer circuits 332A, 332B are alternately operated in an active state to sample the input signal, and a deactivated state (e.g., a high impedance state).

As shown in FIG. 3, the hold stage 314 includes a first capacitor circuit 334A and a second capacitor circuit 334B that each include a pair of capacitors coupled between the respective positive and negative signals of the differential sampled signals 326A, 326B and a ground reference. The capacitor circuits 334A, 334B of the hold stage 314 are each configured to receive the respective sampled signal 326A, 326B from the mixer circuits 332A, 332B, and output the sampled signals 326A, 326B as a hold signals 328A, 328B after applying a delay. As shown in FIG. 3, the output stage 316 includes a pair of switches 336A, 336B configured to alternately couple the first hold signal 328A from the first capacitor circuit 334A and the second hold signal 328B from the second capacitor circuit 334B as the demodulated output signal 322 of the demodulator circuit 301, including positive output signal 324A and a negative output signal 324B.

In some examples, as shown in FIG. 3, the demodulator circuit 301 further includes a pair of resistors 311A, 311B with first ends coupled to the differential input signals 322A, 322B of the demodulator circuit 301 and second ends coupled to the sampling stage 312 (i.e., an input of the mixer circuits 332A, 332B), that receives the input signal 322. In some examples, the resistors 311A, 311B operate in conjunction with the first capacitor circuit 334A and the second capacitor circuit 334B as a low pass filter to filter the input signal 322. In some examples, arranging resistors 311A, 311B at an input of demodulator circuit 301 exposes an input of the mixer stage 312 to a fraction of the full amplitude of the input signal 322A, 322B, which may increase a dynamic range of the demodulator circuit 301 in comparison to traditional demodulator circuits.

Figure 4:
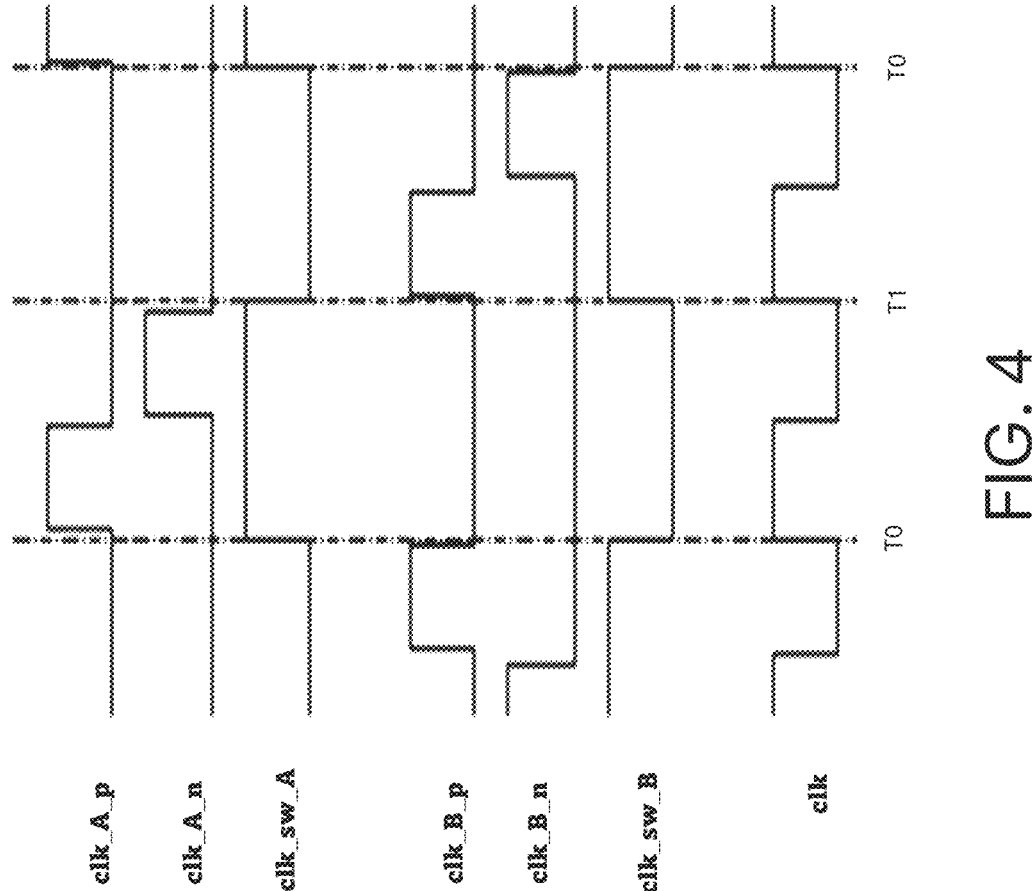
FIG. 4 is a timing diagram depicting operation of the respective clock signals shown in the FIG. 3 circuit diagram relative to a global clock signal according to some embodiments.

FIG. 4 is a timing diagram depicting operation of the respective clock signals shown in the FIG. 3 circuit diagram relative to a global clock signal according to some embodiments. As shown in FIG. 4, at a first time T0, the global clock signal clk is alternatingly supplied to two pairs of matched pass transistors (not depicted) of the first mixer circuit 332A as the complementary clock signals clk_A_p and clk_A_n, which sample the input signal 322 and generate a sampled signal 326A. Also at time T0, the clk_sw_A signal transitions high (a positive edge) and the clk_sw_B signal transitions low (a negative edge), coupling a hold signal 328B from the second capacitor circuit 334B as an output signal 324 of the demodulator circuit 301. At a second time T1, the global clock signal clk is alternatingly supplied to two pair of pass transistors (not depicted) of the second mixer circuit 332B as the complementary clock signals clk_B_p and clk_B_n, which sample the input signal 322 and generate a sampled signal 326B. Also at time T1, the clk_sw_A signal transitions low (a negative edge) and the clk_sw_B signal transitions high (a positive edge), coupling a hold signal 328A from the second capacitor circuit 334A as an output signal 324 of the demodulator circuit 301.

Figure 5:
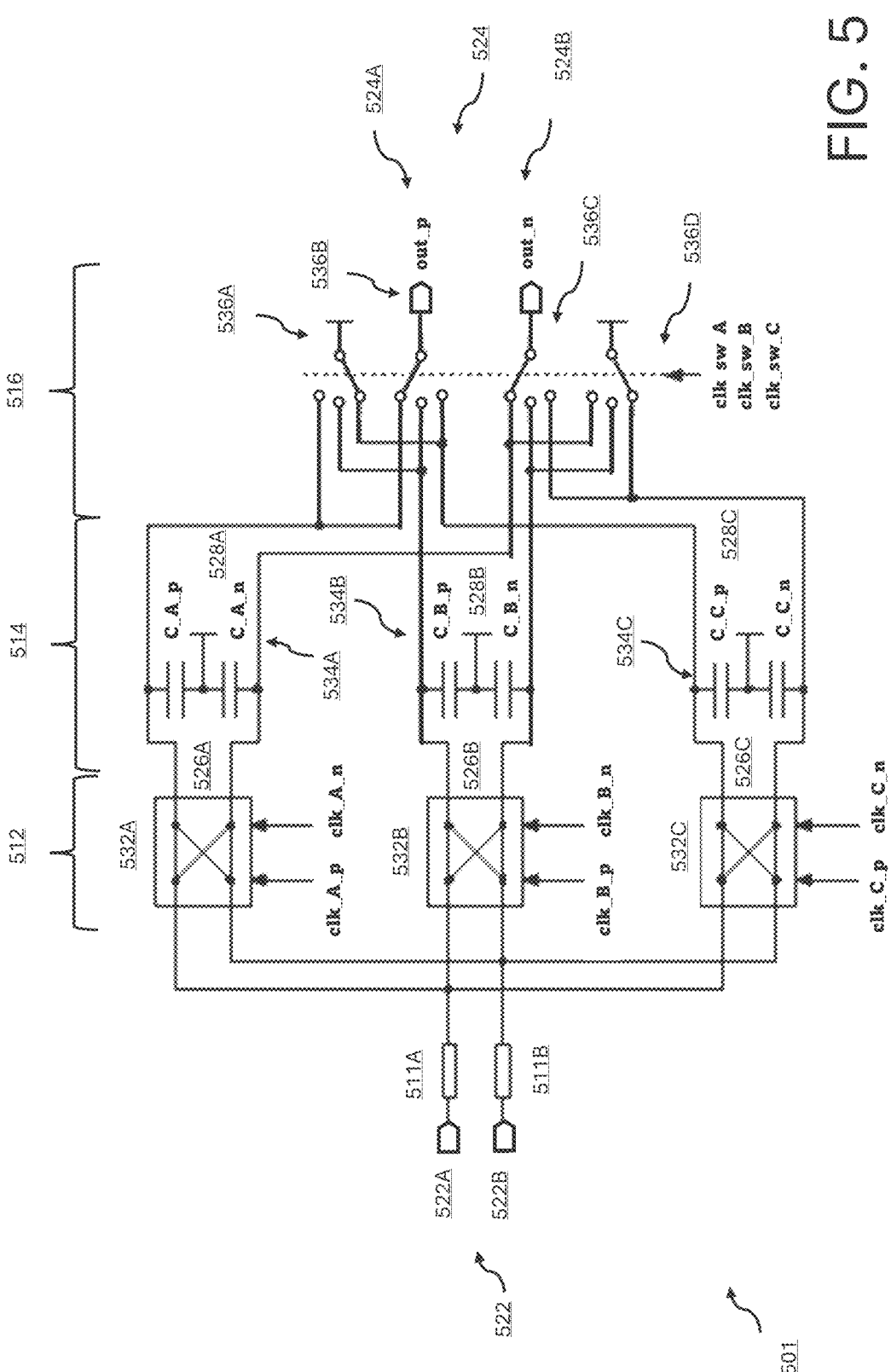
FIG. 5 is a circuit diagram depicting one example of a demodulator circuit including a sampling stage with a plurality of mixer circuits according to some embodiments.

FIG. 5 is a circuit diagram depicting one example of a demodulator circuit 501 including a sampling stage 512 with a plurality of mixer circuits 528A-528C according to some embodiments. As shown in FIG. 5, like the example of FIG. 3, the demodulator circuit 501 includes the sampling stage 512 configured to receive and sample an input signal 522, a hold stage 514 configured to receive sampled signals 526A-526C from the sample stage 512 and output the sampled signals as hold signals 528A-528C after a delay, and an output stage 516 includes a plurality of switches 536A-536D configured to alternately couple the hold signals 528A-528C as an output signal 524 of the demodulator circuit 501.

As shown, the example of FIG. 5 differs from the example of FIG. 3 in that demodulator circuit 501 includes three mixer circuits instead of two. Specifically, a first mixer 532A coupled to output a sampled signal 526A to a first capacitor circuit 534A that outputs a first hold signal 528A, a second mixer 532A coupled to output a sampled signal 526B to a second capacitor circuit 534B that outputs a second hold signal 528B, and third mixer 532C coupled to output a sampled signal 526C to a third capacitor circuit 534C that outputs a third hold signal 528C. As shown also shown in FIG. 5, demodulator circuit 501 also includes four switches 536A, 536B, 536C, 536D that are configured to alternate between coupling the first hold signal 528A, the second hold signal 528B, and the third hold signal 528C as the output signal 524, including differential output signals 524A and 524B. The demodulator circuit 501 of FIG. 5 may be operated similarly to described above with respect to the timing diagram of FIG. 4, but alternating between all three of the mixers 532A-532C, as well as the switches 536A-536D.

In some examples, as shown in FIG. 5, the demodulator circuit 501 further includes a pair of resistors 511A, 511B with first ends coupled to the input signal 522A, 522B of the demodulator circuit 501 and second ends coupled to the sampling stage 512 (i.e., an input of the mixers 532A, 532B, and 532C), that receives the input signal 322. In some examples, the resistors 511A, 511B operate in conjunction with the first capacitor circuit 534A, the second capacitor circuit 534B, and the third capacitor circuit 534C as a low pass filter to filter the input signal 522. In some examples, the resistors 511 operate to filter the input signal 522A, 522B as an average across a current period. In some examples, arranging resistors 511A, 511B at an input of demodulator circuit 501 exposes an input of the mixers 532A-532C to a fraction of the full amplitude of the input signal 522A, 522B, which may increase a dynamic range of the demodulator circuit 501 in comparison to traditional demodulator circuits.

In some examples, the example of FIG. 5 differs from the example of FIG. 3 in at the switches 536 of the output stage 516 are operable in a further discharge phase such that after the hold phase, each capacitor circuit 534A-534C stores a new sample independent from a previous sample. In some examples, the resistors 311A, 311B operate in conjunction with the respective capacitor circuits 334A, 334B to operate as a low pass filter as an average across the carrier envelope (i.e., across multiple clock periods) to filter the input signal 322. In contrast, in the example of FIG. 5, the depicted resistors 511A, 511B may operate in conjunction with the respective capacitor circuits 534A-532C as a low pass filter on a clock period by clock period basis, independent of previous clock periods.

Figure 6:
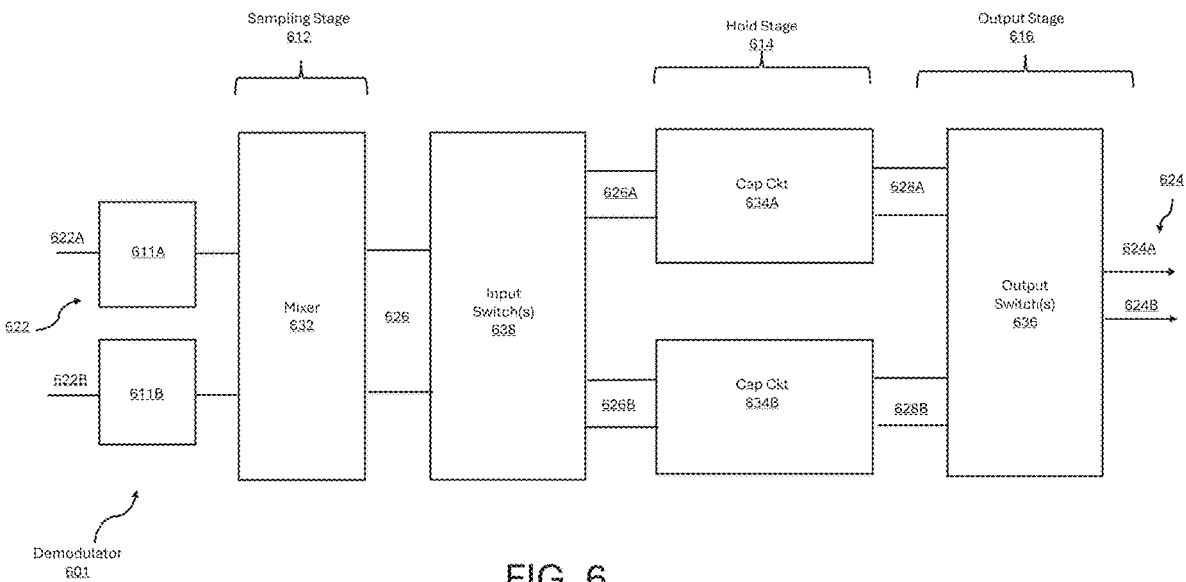
FIG. 6 is a block diagram of a demodulator that includes a sampling stage with a mixer, and one or more input switch(s) that couple a sampled signal to a hold stage according to some embodiments.

FIG. 6 is a block diagram of a demodulator 601 that includes a sampling stage with a mixer 632, and one or more input switch(s) 636 that couple a sampled signal 626 to a hold stage 614 according to some embodiments. As shown in FIG. 6, the demodulator 601 includes the sampling stage 612, the hold stage 614, and an output stage 616. In the example of FIG. 6, the sampling stage 612 includes a single mixer 632 that is coupled to receive a differential input signal 622. Like the FIG. 2 example, the mixer 632 includes a two pair of matched transistors that alternately activated to sample the differential input signal 622. As shown in FIG. 6, the mixer 632 outputs a sampled signal 626 to one or more input switches 638 operable to alternatingly couple the sampled signal 626 to a first capacitor circuit 634A and a second capacitor circuit 634B of the hold stage 614. The capacitor circuits 634A, 634B are each configured to delay the respective sampled signal 626A, 626B from the input switch(s) 638, to generate respective hold signals 628A, 628B. As shown in FIG. 6, the output stage 614 includes one or more switch(s) 636 that alternate between coupling a hold signal 628A from the first capacitor circuit 634A, and a hold signal 628B from the second capacitor circuit 634B as an output signal 624 of the demodulator 601, including a first output signal 624A and a complementary second output signal 624B.

In some examples, as shown in FIG. 6, the demodulator 601 further includes a pair of resistors 611A, 611B with first ends coupled to the differential inputs 622A, 622B of the demodulator 601 and second ends coupled to the sampling stage 612 (i.e., an input of the mixer 632), that receives the input signal 622). In some examples, the resistors 611A, 611B operate in conjunction with the first capacitor circuit 634A and the second capacitor circuit 634B as a low pass filter to filter the input signal 622. In some examples, arranging resistors 611A, 611B at an input of demodulator 601 exposes an input of the mixer stage 212 to a fraction of the full amplitude of the input signal 222A, 222B, which may increase a dynamic range of the demodulator 601 in comparison to traditional demodulator circuits.

Figure 7:
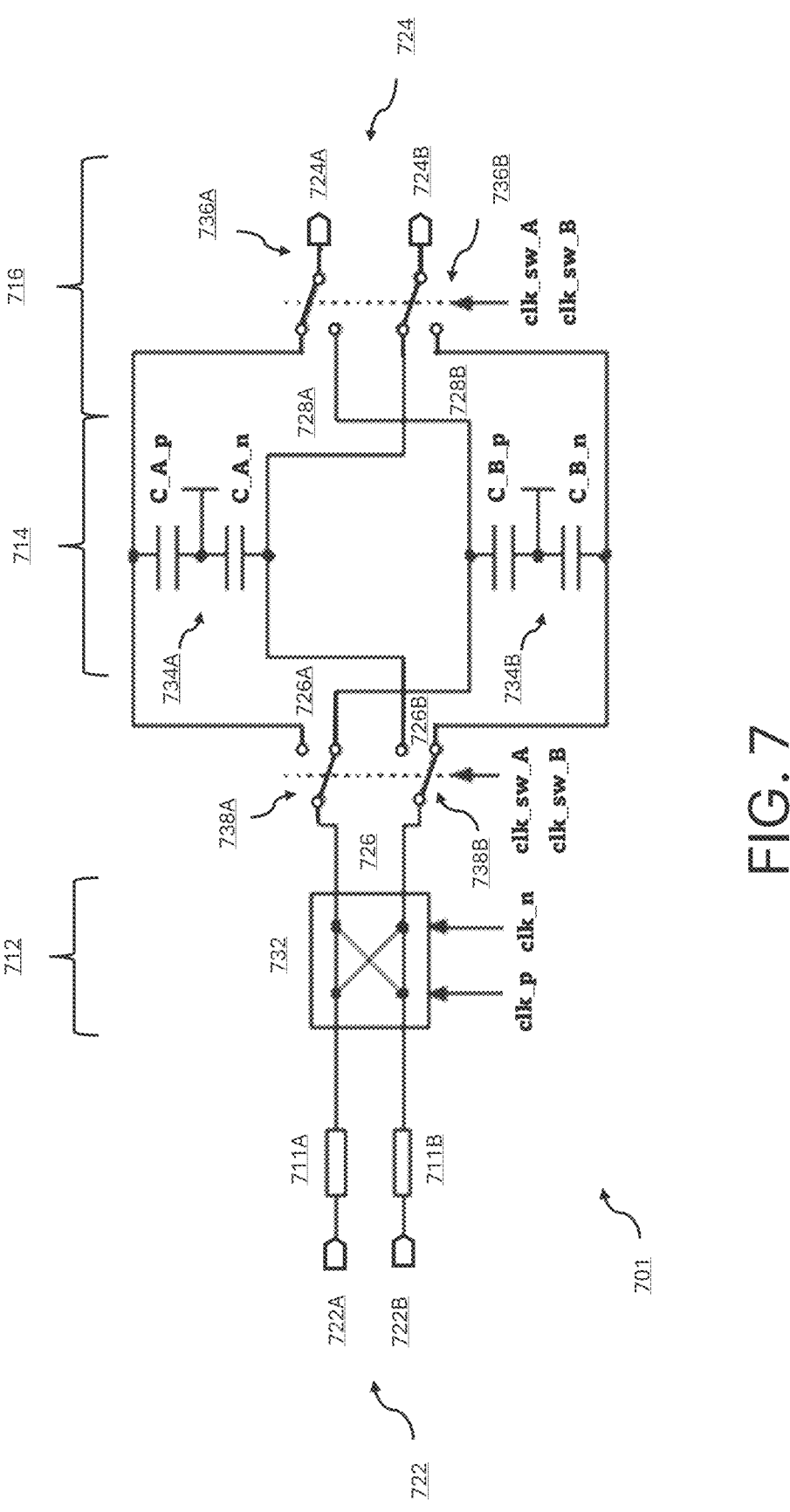
FIG. 7 is a circuit diagram that depicts a demodulator circuit that includes a sampling stage with a mixer, and one or more input switch(s) that couple a sampled signal to a hold stage according to some embodiments.

FIG. 7 is a circuit diagram that depicts a demodulator circuit 701 that includes a sampling stage with a mixer circuit 732, and one or more input switch(s) 736 that couple a sampled signal 726 to a hold stage 714 according to some embodiments. As shown in FIG. 7, the demodulator circuit 701 includes the sampling stage 712, the hold stage 714, and a switching stage 716. Like the block diagram of FIG. 7, the sampling stage 712 includes a single mixer circuit 732 coupled to the input signal 722, which is a differential input signal including a first signal 722A and a complimentary second signal 722B. As shown in FIG. 7, the mixer circuit 732 includes two pair of matched transistors configured to be operated according to complementary clock signals clk_p/clk_n, respectively to sample the input signal 722 to generate sampled signals 726. The clock signal clk_p may be the same as the clk signal depicted in FIG. 4. The clock signal clk_n may be complimentary to the clock signal clk depicted in FIG. 4.

As shown in FIG. 7, the hold stage 714 includes a first capacitor circuit 734A and a second capacitor circuit 734B that each include a pair of capacitors coupled between the respective positive and negative signals of the sampled signals 726A, 726B and a ground reference. The capacitor circuits 734A, 734B of the hold stage 714 are each configured to receive the sampled signal 726 from the mixer circuit 732, and output the sampled signal 726 as a hold signals 728A, 728B after applying a delay. As shown in FIG. 7, the output stage 716 includes a pair of switches 736A, 736B configured to alternately couple the first hold signal 728A from the first capacitor circuit 734A and the second hold signal 728B from the second capacitor circuit 734B as the output signal 724 of the demodulator circuit 701, including positive output signal 724A and a negative output signal 724B of the differential output signal 724.

As shown in FIG. 7, the mixer circuit 732 outputs a sampled signal 726 to a pair of input switches 738A, 738B to alternatingly coupled the sampled signal 726 to a first capacitor circuit 734A as a sampled signal 726A and a second capacitor circuit 734B as a sampled signal 726B. As shown in FIG. 7, the output stage 716 includes a pair of switches 736A, 736B configured to alternately couple the first hold signal 728A from the first capacitor circuit 734A and the second hold signal 728B from the second capacitor circuit 734B as the output signal 722 of the demodulator circuit 701, including positive output signal 724A and a negative output signal 724B of the differential output signal 724.

The demodulator circuit 701 of FIG. 7 may be operated similarly to described above with respect to the timing diagram of FIG. 4. For example, the mixer circuit 732 may be operated to sample the input signal 722 based on timing defined by the complementary clock signal clk_p, and clk_n (e.g., with opposite transitions to the clock signal clk_p), and the respective input switches 738A, 738B and output switches 736A, 736B may be operated according to the clock signals clk_sw_A and clk_sw_B also depicted in the FIG. 4 example.

In some examples, as shown in FIG. 7, the demodulator circuit 701 further includes a pair of resistors 711A, 711B with first ends coupled to the differential input signals 722A, 722B of the demodulator circuit 701 and second ends coupled to the sampling stage 712 (i.e., an input of the mixer circuit 732), that receives the input signal 722. In some examples, the resistors 711A, 711B operate in conjunction with the first capacitor circuit 734A and the second capacitor circuit 734B as a low pass filter to filter the input signal 722. In some examples, arranging resistors 711A, 711B at an input of demodulator circuit 701 exposes an input of the mixers 532A-532C to a fraction of the full amplitude of the input signal 522A, 522B, which may increase a dynamic range of the demodulator circuit 701 in comparison to traditional demodulator circuits.

Figure 8:
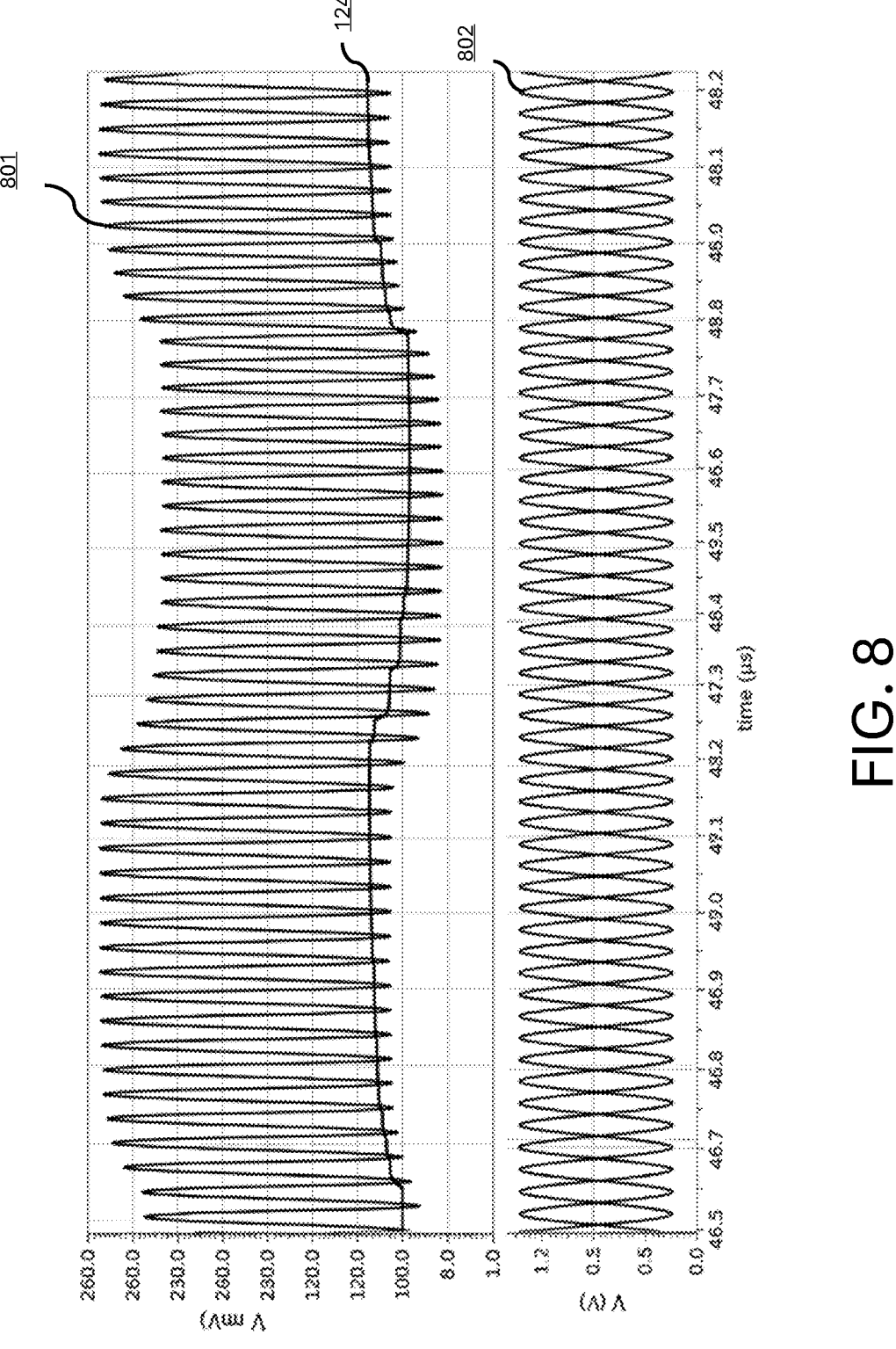
FIG. 8 is a graph depicting a traditional demodulator output signal, and a demodulated output signal of a demodulator, and a carrier frequency of an input signal according to some embodiments.

FIG. 8 is a graph depicting a traditional demodulator output signal 801, and a demodulated output signal 124 of demodulator 101 depicted in FIG. 1, and a carrier frequency 802 of an input signal 122 according to some embodiments. As shown in FIG. 8, the traditional demodulator output signal 801 is significantly impacted by a large ripple current, and varies over a wide range, from around 80 millivolts (mV) to around 260 mV. In contrast, the demodulated output signal 124 of the demodulator 101 is substantially constant and stable in comparison, i.e., it varies far less than the traditional demodulator output signal 801. In some examples, the demodulatar 101 may completely remove the impact of ripple from the output signal as shown in the FIG. 8 example. As shown in FIG. 9, demodulator 101, as well as other demodulators/demodulators circuits described herein, may be particularly suitable to demodulate input signals that vary over a wide dynamic range and/or that may be impacted by a relatively large carrier ripple.

FIG. 9 is a flow diagram depicting one example of a method of operating a demodulator according to some embodiments. As shown in FIG. 9, at 901, the method includes controlling at least one mixer 132 with complementary clock signals synchronous with a carrier frequency of an input signal to demodulate the input signal and generate a sampled signal 126. As also shown in FIG. 9, at 902, the method includes delaying, by a first capacitor circuit 134A, the sampled signal 126 to output a first hold signal 128A. As also shown in FIG. 9, at 903, the method further includes delaying, by a second capacitor circuit 134B, the sampled signal 126 to output a second hold signal 128B. As also shown in FIG. 9, at 904, the method further includes alternately coupling the first hold signal 128A and the second hold signal 128B as a demodulated output signal 124.

In some examples, the method further includes receiving the input signal 122 via at least one resistor 111 coupled to an input of the at least one mixer 132. In some examples, the method further includes using the at least one resistor 111 and at least one capacitor of the first capacitor circuit 134A and the second capacitor circuit 134B as a low pass filter.

In some examples, the method further includes using a first mixer 232A to generate a first sampled signal and using a second mixer 232B to generate a second sampled signal. In some examples, the method further includes outputting a first sampled signal 226A to the first capacitor circuit 234A, and outputting a second sampled signal 226B to the second capacitor circuit 234B. In some examples, the method further includes using a third mixer 532C to generate a third sampled signal 526C, and using a third capacitor circuit 534C configured to output a third sampled signal 526C after a delay. In some examples, the method further includes alternately coupling the first delayed signal 528A from the first capacitor circuit 534A, the second delayed signal 528B from the second capacitor circuit 534B, and a third delayed signal 528C from the third capacitor circuit 534C as the demodulated output signal 524. In some examples, in addition to alternatingly coupling the first coupling the first delayed signal 528A, the second delayed signal 528B, and the third delayed signal 528C, the method further includes operating the first capacitor circuit 234A, the second capacitor circuit 234B, and the third capacitor circuit 234C in a discharge phase to discharge the respective delayed signals 528A-528C stored by the respective capacitor circuits 234A-234C. In some examples, the method further includes using at least one input switch 638 to alternate between coupling the sampled signal 626 from the at least one mixer 632 to the first capacitor circuit 634A and the second capacitor circuit 634B.

CLAUSES

Clause 1. A demodulator, comprising: a sampling stage comprising at least one mixer configured to be controlled by complementary clock signals synchronous with a carrier frequency of an input signal to demodulate the input signal and generate a sampled signal; a hold stage comprising at least a first capacitor circuit configured to output the sampled signal after delaying the sampled signal as a first hold signal and a second capacitor circuit configured to output the sampled signal after delaying the sampled signal as a second hold signal; and an output stage configured to alternately couple the first hold signal and the second hold signal as a demodulated output signal.

Clause 2. The demodulator of clause 1, further comprising: at least one resistor coupled between the at least one mixer and the input signal.

Clause 3. The demodulator of clause 2, wherein the at least one resistor and at least one capacitor of the first capacitor circuit and the second capacitor circuit operate as a low pass filter.

Clause 4. The demodulator any of clauses 1-3, wherein the sampling stage includes a first mixer coupled to the input signal through a pair of resistors, and a second mixer coupled to the input signal through the pair of resistors.

Clause 5. The demodulator of clause 4, wherein the first mixer outputs a first sampled signal to the first capacitor circuit, and the second mixer outputs a second sampled signal to the second capacitor circuit.

Clause 6. The demodulator of clause 4, further comprising: a third mixer coupled to the input signal through the pair of resistors; and a third capacitor circuit configured to output a third sampled signal after a delay.

Clause 7. The demodulator of clause 6, wherein the output stage is configured to alternately couple the first hold signal from the first capacitor circuit, the second hold signal from the second capacitor circuit, and a third hold signal from the third capacitor circuit as the demodulated output signal.

Clause 8. The demodulator of any of clauses 1-7, further comprising: at least one input switch configured to alternate between coupling the sampled signal from the at least one mixer to the first capacitor circuit and the second capacitor circuit.

Clause 9. A method, comprising: controlling at least one mixer with complementary clock signals synchronous with a carrier frequency of an input signal to demodulate the input signal and generate a sampled signal; delaying, by a first capacitor circuit, the sampled signal to output a first hold signal; delaying, by a second capacitor circuit, the sampled signal to output a second hold signal; and alternately coupling the first hold signal and the second hold signal as a demodulated output signal.

Clause 10. The method of clause 9, further comprising: receiving the input signal via at least one resistor coupled to an input of the at least one mixer.

Clause 11. The method of clause 10, further comprising: using the at least one resistor and at least one capacitor of the first capacitor circuit and the second capacitor circuit as a low pass filter.

Clause 12. The method of any of clauses 9-11, further comprising: using a first mixer to generate a first sampled signal and using a second mixer to generate a second sampled signal.

Clause 13. The method of any of clauses 9-12, further comprising: outputting a first sampled signal to the first capacitor circuit, and outputting a second sampled signal to the second capacitor circuit.

Clause 14. The method of any of clauses 9-13, further comprising: using a third mixer to generate a third sampled signal, and using a third capacitor circuit configured to output a third sampled signal after a delay.

Clause 15. The method of clause 14, further comprising: alternately coupling the first hold signal from the first capacitor circuit, the second hold signal from the second capacitor circuit, and a third hold signal from the third capacitor circuit as the demodulated output signal.

Clause 16. The method of any of clauses 9-15, further comprising: using at least one input switch to alternate between coupling the sampled signal from the at least one mixer to the first capacitor circuit and the second capacitor circuit.

Clause 17. A near field communication (NFC) receiver, comprising: a demodulator that includes: at least one mixer configured to controlled by complementary clock signals synchronous with a carrier frequency of an input signal to demodulate the input signal and generate a sampled signal; at least a first capacitor circuit configured to output the sampled signal after delaying the sampled signal as a first hold signal and a second capacitor circuit configured to output the sampled signal after delaying the sampled signal as a second hold signal; and at least one switch configured to alternately couple the first hold signal and a second hold signal as a demodulated output signal.

Clause 18. The NFC receiver of clause 17, further comprising: at least one resistor coupled between the at least one mixer and the input signal, wherein the at least one resistor and at least one capacitor of the first capacitor circuit and the second capacitor circuit operate as a low pass filter.

Clause 19. The NFC receiver of any of clauses 17 and 18, wherein the at least one mixer comprises a first mixer that outputs a first sampled signal to the first capacitor circuit, and the second mixer that outputs a second sampled signal to the second capacitor circuit.

Clause 20. The NFC receiver of any of clauses 17-19, wherein the at least one mixer is a mixer, and further comprising: at least one input switch configured to alternate between coupling the sampled signal from the mixer to the first capacitor circuit and the second capacitor circuit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A demodulator, comprising:
a sampling stage comprising at least one mixer configured to be controlled by complementary clock signals synchronous with a carrier frequency of an input signal to demodulate the input signal and generate a sampled signal;
a hold stage comprising at least a first capacitor circuit configured to output the sampled signal after delaying the sampled signal as a first hold signal and a second capacitor circuit configured to output the sampled signal after delaying the sampled signal as a second hold signal; and
an output stage configured to alternately couple the first hold signal and the second hold signal as a demodulated output signal.

2. The demodulator of claim 1, further comprising:
at least one resistor coupled between the at least one mixer and the input signal.

3. The demodulator of claim 2, wherein the at least one resistor and at least one capacitor of the first capacitor circuit and the second capacitor circuit operate as a low pass filter.

4. The demodulator of claim 1, wherein the sampling stage includes a first mixer coupled to the input signal through a pair of resistors, and a second mixer coupled to the input signal through the pair of resistors.

5. The demodulator of claim 4, wherein the first mixer outputs a first sampled signal to the first capacitor circuit, and the second mixer outputs a second sampled signal to the second capacitor circuit.

6. The demodulator of claim 4, further comprising:
a third mixer coupled to the input signal through the pair of resistors; and
a third capacitor circuit configured to output a third sampled signal after a delay.

7. The demodulator of claim 6, wherein the output stage is configured to:
alternately couple the first hold signal from the first capacitor circuit, the second hold signal from the second capacitor circuit, and a third hold signal from the third capacitor circuit as the demodulated output signal.

8. The demodulator of claim 1, further comprising:
at least one input switch configured to alternate between coupling the sampled signal from the at least one mixer to the first capacitor circuit and the second capacitor circuit.

9. A method, comprising:
controlling at least one mixer with complementary clock signals synchronous with a carrier frequency of an input signal to demodulate the input signal and generate a sampled signal;
delaying, by a first capacitor circuit, the sampled signal to output a first hold signal;
delaying, by a second capacitor circuit, the sampled signal to output a second hold signal; and
alternately coupling the first hold signal and the second hold signal as a demodulated output signal.

10. The method of claim 9, further comprising:
receiving the input signal via at least one resistor coupled to an input of the at least one mixer.

11. The method of claim 10, further comprising:
using the at least one resistor and at least one capacitor of the first capacitor circuit and the second capacitor circuit as a low pass filter.

12. The method of claim 9, further comprising:
using a first mixer to generate a first sampled signal and using a second mixer to generate a second sampled signal.

13. The method of claim 9, further comprising:
outputting a first sampled signal to the first capacitor circuit, and outputting a second sampled signal to the second capacitor circuit.

14. The method of claim 13, further comprising:
using a third mixer to generate a third sampled signal, and using a third capacitor circuit configured to output the third sampled signal after a delay.

15. The method of claim 14, further comprising:
alternately coupling the first hold signal from the first capacitor circuit, the second hold signal from the second capacitor circuit, and a third hold signal from the third capacitor circuit as the demodulated output signal.

16. The method of claim 9, further comprising:
using at least one input switch to alternate between coupling the sampled signal from the at least one mixer to the first capacitor circuit and the second capacitor circuit.

17. A near field communication (NFC) receiver, comprising:
a demodulator that includes:
at least one mixer configured to be controlled by complementary clock signals synchronous with a carrier frequency of an input signal to demodulate the input signal and generate a sampled signal;
at least a first capacitor circuit configured to output the sampled signal after delaying the sampled signal as a first hold signal and a second capacitor circuit configured to output the sampled signal after delaying the sampled signal as a second hold signal; and
at least one switch configured to alternately couple the first hold signal and the second hold signal as a demodulated output signal.

18. The NFC receiver of claim 17, further comprising:
at least one resistor coupled between the at least one mixer and the input signal, wherein the at least one resistor and at least one capacitor of the first capacitor circuit and the second capacitor circuit operate as a low pass filter.

19. The NFC receiver of claim 17, wherein the at least one mixer comprises a first mixer that outputs a first sampled signal to the first capacitor circuit, and a second mixer that outputs a second sampled signal to the second capacitor circuit.

20. The NFC receiver of claim 17, wherein the at least one mixer is a mixer, and further comprising:

at least one input switch configured to alternate between coupling the sampled signal from the mixer to the first capacitor circuit and the second capacitor circuit.

* * * * *